United States Patent
Kuo et al.

(10) Patent No.: US 8,044,805 B2
(45) Date of Patent: Oct. 25, 2011

(54) RFID TAG USING MONOPOLE ANTENNA

(75) Inventors: Shih-Kang Kuo, Kaohsiung (TW);
Sung-Lin Chen, Kaohsiung (TW);
Chang-Tsun Lin, Kaohsiung (TW);
Lung-Chi Liao, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 279 days.

(21) Appl. No.: 12/389,958

(22) Filed: Feb. 20, 2009

(65) Prior Publication Data

US 2009/0231141 A1  Sep. 17, 2009

(30) Foreign Application Priority Data

Mar. 12, 2008  (TW) ................ 97108719 A (51) Int. Cl.
*G08B 13/14*  (2006.01)
(52) U.S. Cl. ...................... 340/572.7; 343/871
(58) Field of Classification Search ............... 340/572.7, 340/572.8; 343/866, 871
See application file for complete search history.

(56) References Cited

U.S. PATENT DOCUMENTS

| | | | |
|---|---|---|---|
| 6,914,562 B2 | 7/2005 | Forster | |
| 7,205,953 B2 * | 4/2007 | Knadle et al. | 343/792.5 |
| 7,379,024 B2 * | 5/2008 | Forster et al. | 343/700 MS |
| 2005/0093677 A1 | 5/2005 | Forster et al. | |
| 2005/0275591 A1 | 12/2005 | King et al. | |

FOREIGN PATENT DOCUMENTS

| | | |
|---|---|---|
| CN | 1303283 C | 3/2007 |
| CN | 101048043 A | 10/2007 |
| WO | WO 2004/093246 | 10/2004 |
| WO | WO 2007/111417 | 10/2007 |

OTHER PUBLICATIONS

European Search Report dated May 25, 2009 for application 09153549.2 which is the corresponding European Application.
Taiwanese Office Action dated May 3, 2011 for 097108719, which is a corresponding Taiwanese application.

(Continued)

*Primary Examiner* — John A Twell, Jr.
(74) *Attorney, Agent, or Firm* — WPAT, P.C.; Anthony King (57) ABSTRACT

A radio frequency identification (RFID) tag using a monopole antenna is provided, in which an antenna structure is disposed on a metal plate, two ends of an RFID chip are electrically connected to the antenna structure, and the antenna structure and the RFID chip form a loop structure. The RFID tag can be disposed on a surface of an object to be measured, or disposed in an inner accommodation space of the object to be measured, so it is widely used in various applications. Additionally, the RFID tag is easily manufactured, so the production cost can be reduced. Furthermore, the RFID tag has a larger readable distance, and an electromagnetic wave emitting direction of the RFID tag is adjustable according to different included angles between the metal plate and the antenna structure, thereby causing signals to be read easily and identification ability to improve, two desirable effects.

14 Claims, 6 Drawing Sheets

OTHER PUBLICATIONS

C. Cho et al., Broadband RFID tag antenna with quasi-isotropic radiation pattern, Electronics Letters Volume, Sep. 29, 2005, vol. 41, No. 20.

European examination report dated Apr. 20, 2011 for 09153549.2, which is a corresponding European application.

"Included Angle Definition", Internet Citation, Apr. 12, 2011, pp. 1, XP007918215, Retrieved from the Internet: URL: http://ww.mathopenref.com/angleincluded.html.

"Vertex", Internet Citation, Apr. 12, 2011, pp. 1-2, XP007918216, Retrieved from the Internet: URL: http://www.mathopenref.com/vertex.html.

Chinese Office Action dated Feb. 23, 2011 for 200810146712.9, which is a corresponding Chinese application.

Zou Derong, Application of Nano-Scale CaCO3 in Hydroxyl Terminated Polybutadiene/ Pu Paint , Jun. 24, 2011.

* cited by examiner

FIG. 10 ced easily and identification ability to improve, two desirable
RFID TAG USING MONOPOLE ANTENNA

BACKGROUND OF THE INVENTION

1. Field of the Invention

The present invention relates to an identification tag, and more particularly to a radio frequency identification (RFID) tag using a monopole antenna.

2. Description of the Related Art

Figure 1:
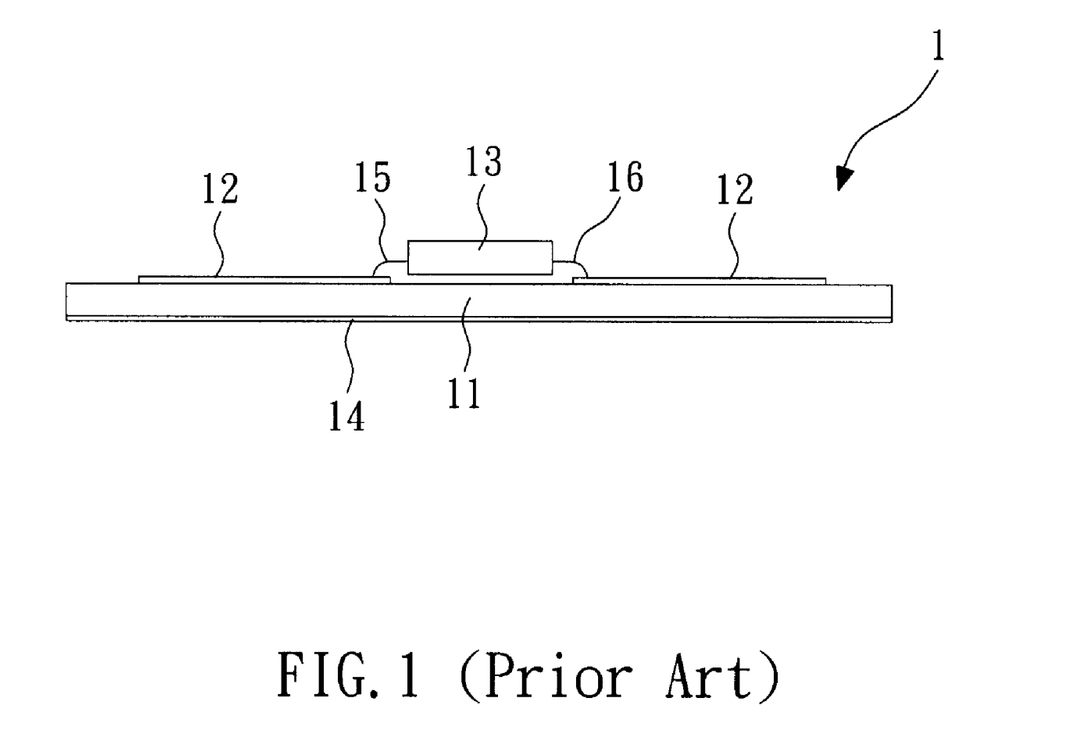
FIG. 1 is a schematic diagram of an RFID tag disclosed in U.S. Pat. No. 6,914,562.

FIG. 1 is a schematic diagram of an RFID tag disclosed in U.S. Pat. No. 6,914,562. The conventional RFID tag 1 includes a packaging wall 11, two conductive tabs 12, an RFID device 13, and a radio frequency reflecting structure 14. The conductive tabs 12 and the RFID device 13 are disposed on a surface of the packaging wall 11, and the RFID device 13 is electrically connected to the conductive tabs 12. There are two feed points 15 and 16 between the RFID device 13 and the conductive tabs 12. The radio frequency reflecting structure 14 is disposed on the other surface of the packaging wall 11. In the conventional RFID tag 1, the radio frequency reflecting structure 14 is a metal plate.

The impedance of the conventional RFID tag 1 varies by means of adjustment of the positions of the conductive tabs 12 and the feed points 15 and 16. The conventional RFID tag 1 is disposed on different package structures or containers, but a readable distance of the conventional RFID tag 1 is not improved.

The conventional RFID tag 1 is applicable to a metal object to be measured and is flatly disposed on a surface of the object to be measured. As known in common practice, in order to prevent the conventional RFID tag 1 from approaching the metal too closely and reducing the radiation efficiency, the packaging wall 11 (a dielectric material) may have a certain thickness, so as to reduce the interference with the metal object to be measured; otherwise, the real part impedance in the Smith Chart (an impedance chart in a complex coordinate system) will be too small to emit an electromagnetic wave efficiently. Furthermore, the specification of U.S. Pat. No. 6,914,562 explicitly discloses that, at UHF frequencies, defined as a band in the range of 860 MHz to 950 MHz, a dielectric thickness of about 3 millimeters to 6 millimeters of the packaging wall 11 is required, so the entire thickness is quite substantial and the production cost is rather high (i.e., requiring more materials), and meanwhile, the readable distance is not improved.

Therefore, there is a need for an RFID tag using a monopole antenna that meets the novelty and inventiveness requirements and solves the above problems.

SUMMARY OF THE INVENTION

The present invention provides a radio frequency identification (RFID) tag using a monopole antenna, which includes a metal plate, an antenna structure, and an RFID chip. The antenna structure is connected to the metal plate. Two ends of the RFID chip are electrically connected to the antenna structure. The RFID chip, the antenna structure, and the metal plate form a loop structure.

The RFID tag of the present invention can be disposed on a surface of an object (metal or nonmetal object) to be measured, or disposed in an inner accommodation space of the object to be measured, so the RFID tag is widely used in various applications. Additionally, the RFID tag of the present invention is easily manufactured, so the production cost can be reduced. Furthermore, the RFID tag of the present invention has a larger readable distance, and an electromagnetic wave emitting direction of the RFID tag is adjustable according to different included angles between the metal plate and the antenna structure, thereby causing signals to be read easily and identification ability to improve, two desirable effects.

DETAILED DESCRIPTION OF THE INVENTION

Figure 2:
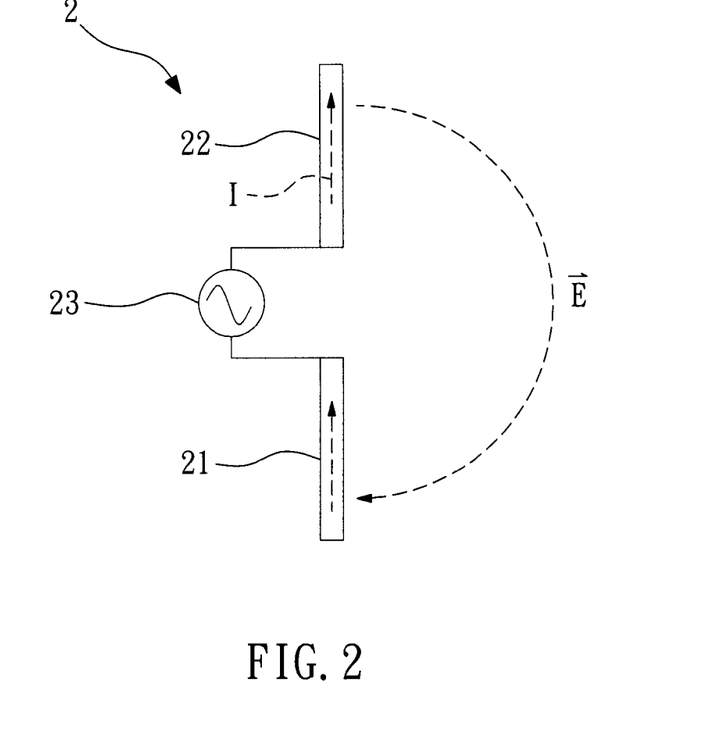
FIG. 2 is a schematic diagram of a dipole antenna.

FIG. 2 is a schematic diagram of a dipole antenna. The dipole antenna 2 has two support arms 21, 22 that are each connected to a power supply 23, and a current I flows through the support arms 21, 22 to form an electric field $\vec{E}$, so as to produce electromagnetic wave radiation.

Figure 3:
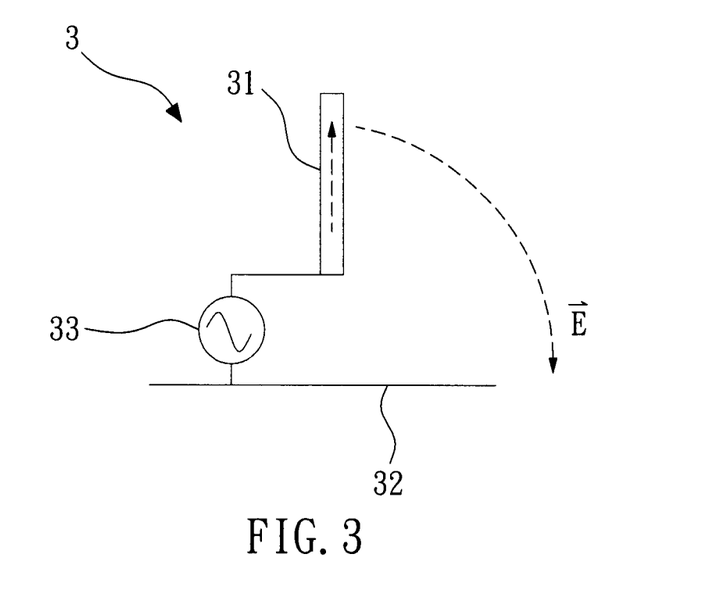
FIG. 3 is a schematic diagram of a monopole antenna.

FIG. 3 is a schematic diagram of a monopole antenna. In order to reduce the volume of the antenna and to construct the antenna conveniently, one of the support arms of the dipole antenna is replaced with a metal plate, so that the dipole antenna is simplified into a monopole antenna 3. The monopole antenna 3 has a support arm 31 and a metal plate 32, in which the support arm 31 is perpendicular to the metal plate 32. The support arm 31 and the metal plate 32 are each connected to a power supply 33, and a current I flows through the support arm 31 to form an electric field $\vec{E}$, thereby producing electromagnetic wave radiation.

The length of the monopole antenna 3 is reduced to half of the length of the dipole antenna. However, the metal plate 32 of the monopole antenna 3 produces an effect of a virtual image current, so that the radiation efficiency of the monopole antenna 3 is equivalent to that of the dipole antenna.

The principle of applying the monopole antenna in the present invention is further applied to an RFID tag. The RFID tag according to the present invention is applicable to both a metal object and a nonmetal object to be measured.

Figure 4:
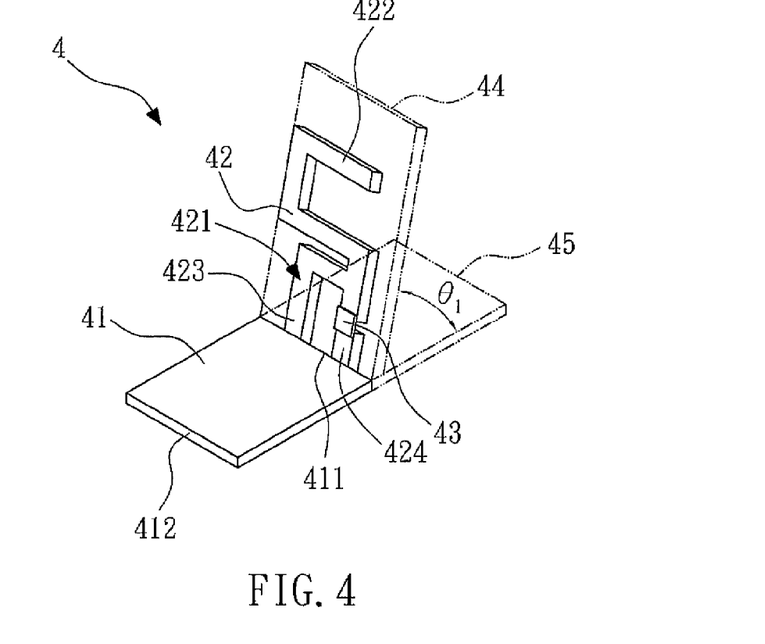
FIG. 4 is a schematic diagram of an RFID tag using a monopole antenna according to a first embodiment of the present invention.

FIG. 4 is a schematic diagram of an RFID tag using a monopole antenna according to a first embodiment of the present invention. As shown in FIG. 4, the RFID tag 4 includes a metal plate 41, an antenna structure 42, and an RFID chip 43. The metal plate 41 is made of copper or aluminum.

The antenna structure 42 is electrically connected to the metal plate 41. The antenna structure 42 is preferably a planar antenna structure. In this embodiment, the metal plate 41 has a first side edge 411 and a second side edge 412 opposite the first side edge 411. The antenna structure 42 is disposed on the first side edge 411 of the metal plate 41. The antenna structure 42 is electrically connected to the metal plate 41, e.g., the antenna structure 42 is electrically connected to the metal plate 41 through a solder. In the embodiment, the metal plate 41 and the antenna structure 42 are made of the same material and configured into an integrated structure. The integral RFID tag 4 can be mass produced through a conventional sheet stamping technology, so that the production cost thereof can be reduced.

Two ends of the RFID chip 43 are electrically connected to the antenna structure 42, so that the RFID chip 43, the antenna structure 42, a first section 423, a second section 424, and the metal plate 41 form a loop structure 421. A power supply (not shown) is fed into the two ends of the RFID chip 43. In the embodiment, a reference plane 44 (shown by a dashed line) where the antenna structure 42 is located forms an included angle $\theta_1$ with an extended plane 45 (shown by a dashed line). The extended plane 45 is a plane extending from the first side edge 411 along a first direction in which the second side edge 412 faces the first side edge 411. It should be noted that, in other applications, the reference plane 44 may be a bearing plate on which the antenna structure 42 and the RFID chip 43 can be disposed, and the bearing plate is disposed on a surface of the metal plate 41.

The included angle $\theta_1$ may be from 45 degrees to 135 degrees and is preferably 90 degrees. Additionally, the RFID tag 4 has an electromagnetic wave emitting direction that varies according to the included angle $\theta_1$. When the RFID tag 4 according to the first embodiment is applied to a nonmetal object, the change of the included angle $\theta_1$ (the change of the electromagnetic wave emitting direction) does not cause a significant variation of the impedance and does not severely affect the characteristics of the RFID tag 4. However, when the RFID tag 4 according to the first embodiment is applied to a metal object, the change of the included angle $\theta_1$ can adjust a maximum emitting direction of the electromagnetic wave, and the optimal identification efficiency is achieved when the included angle $\theta_1$ is 90 degrees.

Figure 5:
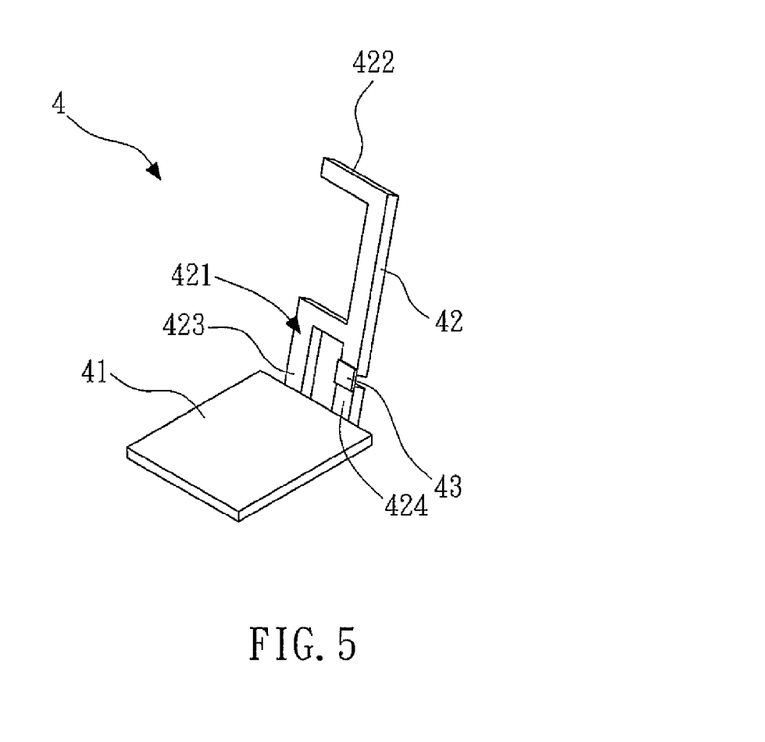
FIG. 5 is a schematic diagram of an RFID tag using a monopole antenna in another aspect of the first embodiment of the present invention.

In the embodiment, the antenna structure 42 further includes an extended metal sheet 422, which is electrically connected to the loop structure 421 and has the effects of impedance match and antenna gain. It should be noted that the extended metal sheet 422 may be ⊏-shaped (horseshoe-shaped), as shown in FIG. 4, and in other applications, the extended metal sheet 422 may be an inverted L-shape, as shown in FIG. 5.

Figure 6:
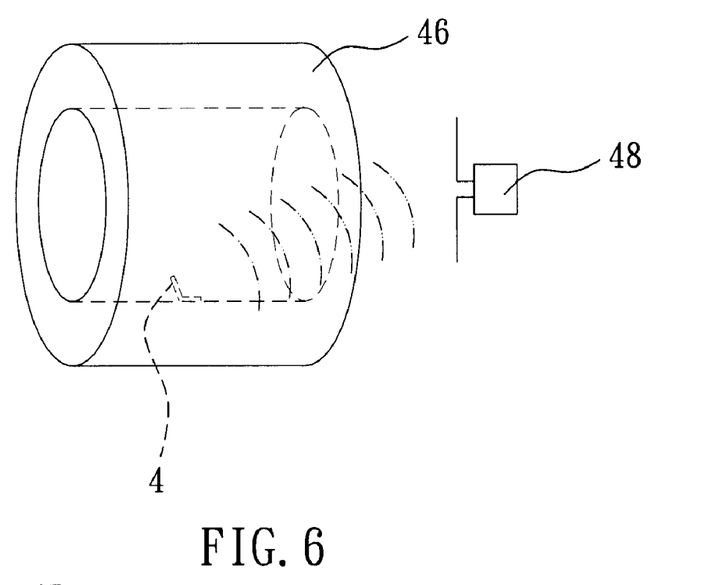
FIG. 6 is a schematic diagram of the RFID tag disposed within a steel coil according to the first embodiment of the present invention.
Figure 7:
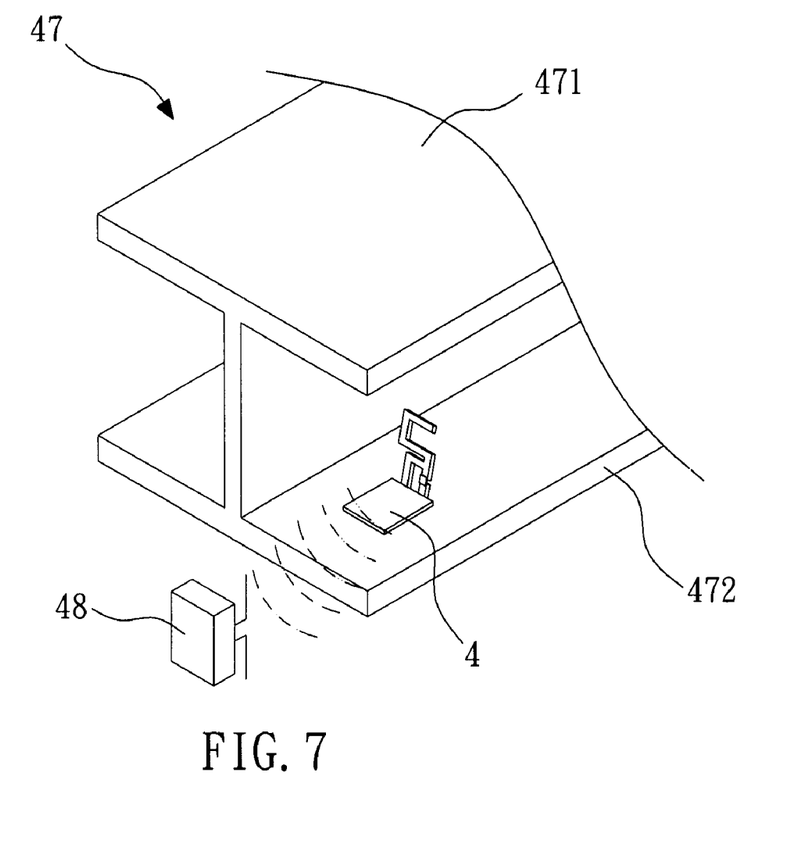
FIG. 7 is a schematic diagram of the RFID tag disposed between two steel plates of a steel H-beam according to the first embodiment of the present invention.

As shown in FIGS. 6 and 7, the RFID tag 4 according to the first embodiment of the present invention may be disposed on a surface of an object to be measured, or disposed in an inner accommodation space of the object to be measured (e.g., disposed on an inner side of a steel coil 46 as shown in FIG. 6, or disposed between two steel plates 471 and 472 of a steel H-beam 47 as shown in FIG. 7), and then, a signal emitted by the RFID tag 4 can be read by a signal reading device 48. Thus, the RFID tag 4 can be widely used in various applications. Therefore, the appropriate personnel can carry out a data reading operation at a certain distance away from the object to be measured without placing the signal reading device 48 into the inner accommodation space of the object to be measured, thereby ensuring their safety. Furthermore, the RFID tag 4 according to the first embodiment of the present invention can easily realize automatic shipping management by using a gate reader.

Figure 8:
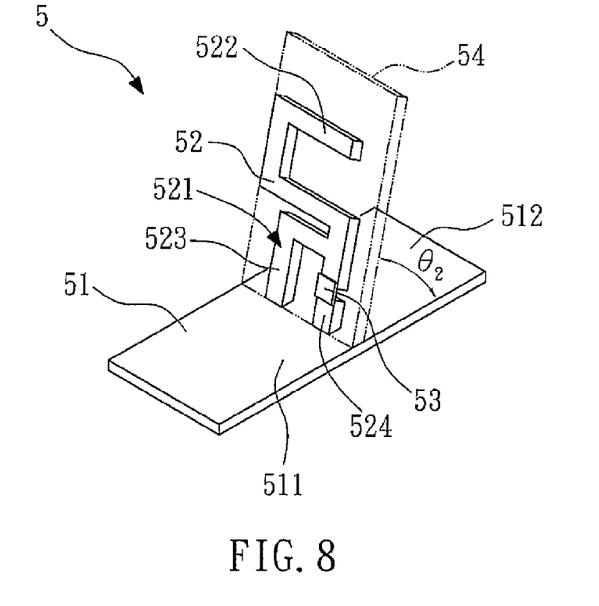
FIG. 8 is a schematic diagram of an RFID tag using a monopole antenna according to a second embodiment of the present invention.

FIG. 8 is a schematic diagram of an RFID tag using a monopole antenna according to a second embodiment of the present invention. As shown in FIG. 8, the RFID tag 5 includes a metal plate 51, an antenna structure 52, a first section 523, a second section 524, and an RFID chip 53. Unlike the RFID tag 4 of the first embodiment shown in FIG. 4, the RFID tag 5 of the second embodiment is disposed on a surface of the metal plate 51 (disposed on a central part of the surface of the metal plate 51 in this embodiment). The metal plate 51 has a first portion 511 and a second portion 512 that are defined by a reference plane 54 (shown by a dashed line) where the antenna structure 52 is located, and the reference plane 54 and the second portion 512 form an included angle $\theta_2$. The included angle $\theta_2$ may be from 45 degrees to 135 degrees, and is preferably 90 degrees.

Figure 9:
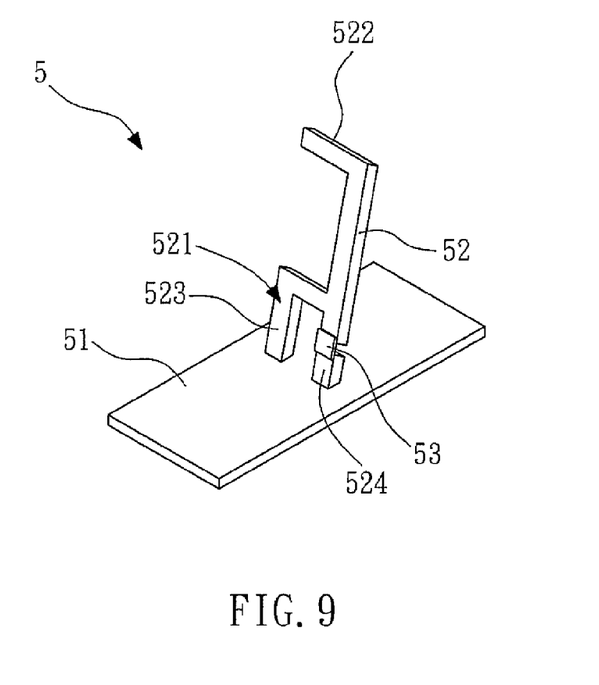
FIG. 9 is a schematic diagram of an RFID tag using the monopole antenna in another aspect of the second embodiment of the present invention.

In the embodiment, the antenna structure 52 further includes an extended metal sheet 522, which is electrically connected to the loop structure 521 and has the effects of impedance match and antenna gain. It should be noted that the extended metal sheet 522 may be ⊏-shaped, as shown in FIG. 8, and in other applications, the extended metal sheet 522 may be an inverted L-shape, as shown in FIG. 9.

Figure 10:
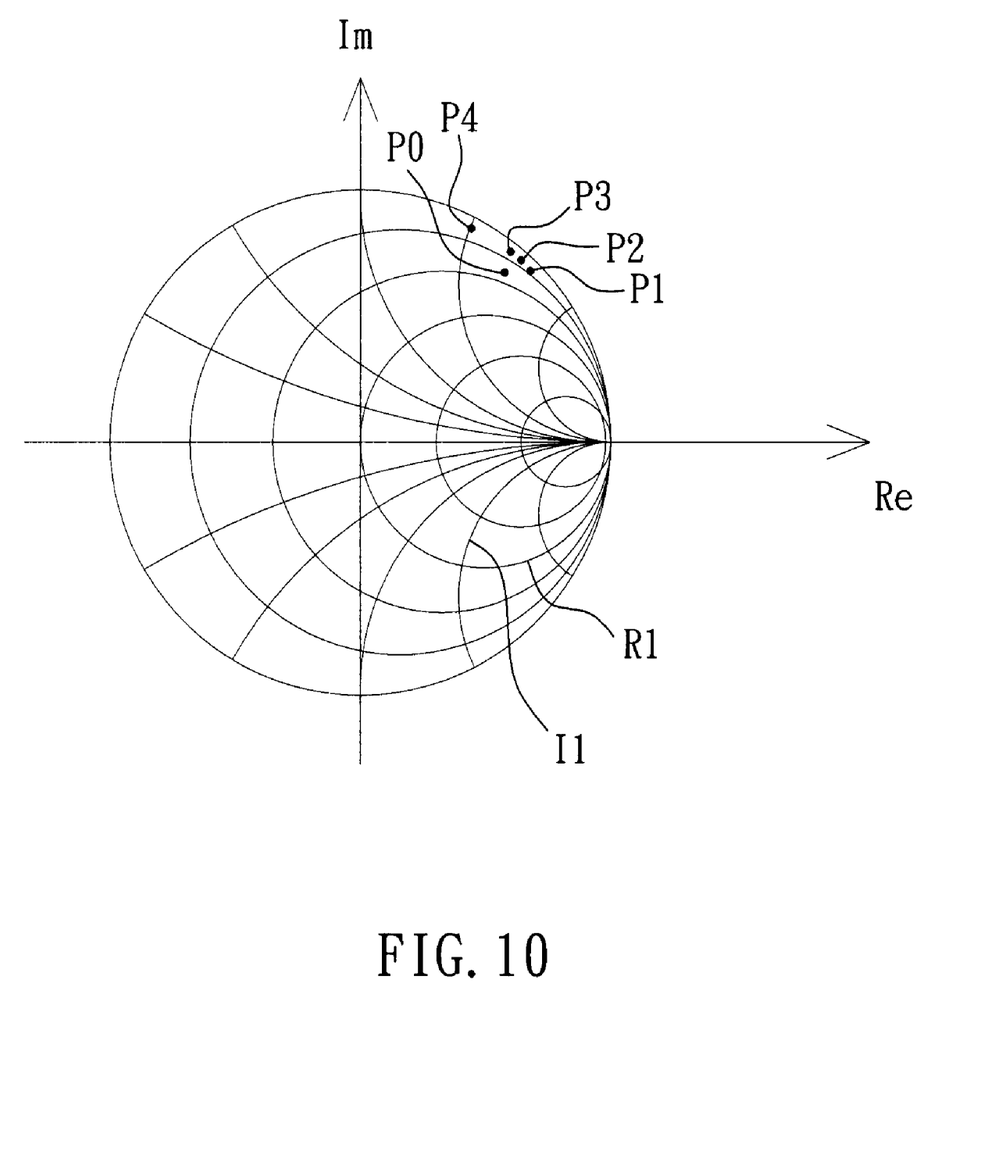
FIG. 10 is a Smith Chart of actual impedances obtained when the RFID tag is applied to a nonmetal object and represented in a complex coordinate system according to the first embodiment of the present invention.

FIG. 10 is a Smith Chart of actual impedances obtained when the RFID tag is applied to a nonmetal object and represented in a complex coordinate system according to the first embodiment of the present invention. The curve R1 represents an impedance curve when a real part of the complex numbers is a certain constant value, whereas the curve I1 represents an impedance curve when an imaginary part of the complex numbers is a certain constant value. P0 represents a conjugate point of target impedances. P1 represents an actual impedance of the RFID tag of the first embodiment when the included angle $\theta_1$ is 0 degrees. P2 represents an actual impedance of the RFID tag of the first embodiment when the included angle $\theta_1$ is 45 degrees. P3 represents an actual impedance of the RFID tag of the first embodiment when the included angle $\theta_1$ is 90 degrees. P4 represents an actual impedance of the RFID tag of the first embodiment when the included angle $\theta_1$ is 135 degrees.

As shown in FIGS. 4 and 10, as the included angle $\theta_1$ decreases, the impedance of the real part and the imaginary part also decreases. When the included angle $\theta_1$ falls between 0 degrees and 90 degrees, the actual impedance of the RFID tag 4 of the first embodiment approaches the conjugate point P0 of the target impedances, thereby achieving a larger readable distance and optimal identification efficiency. When the included angle $\theta_1$ is over 135 degrees, the actual impedance of the RFID tag 4 of the first embodiment offsets from the conjugate point P0 of the target impedances, but such offset does not cause a significant variation of the impedance and does not severely affect the characteristics of the RFID tag 4, i.e., the RFID tag 4 still has excellent identification efficiency.

The gain is about 2.14 dB when the conventional RFID tag is disposed on a surface of a nonmetal object, and it is less than 2.14 dB when the conventional RFID tag is disposed on a surface of a metal object. However, when the RFID tag of the present invention is disposed on a surface of a metal object, the gain reaches 2.5 dB, and thus achieves a preferable gain.

As seen from the actual measurement results, the readable distance of the RFID tag of the present invention reaches from 3.5 meters to 4.5 meters, which is much larger than the readable distance of the loop antenna. Additionally, the structure and the manufacturing process of the RFID tag of the present invention are quite simple (e.g., automatic PCB manufacturing process), so the manufacturing time and production cost can be reduced.

As described above, the RFID tag of the present invention may be disposed on a surface of an object (metal or nonmetal object) to be measured, or disposed in an inner accommodation space of the object to be measured, so the RFID tag of the present invention can be widely used in various applications. Additionally, the RFID tag of the present invention is easily manufactured, so the production cost can be reduced. Furthermore, the RFID tag of the present invention has a larger readable distance, and an electromagnetic wave emitting direction of the RFID tag is adjustable according to different included angles between the metal plate and the antenna structure, thereby causing signals to be read easily and identification ability to improve, two desirable effects.

While the embodiments of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. A radio frequency identification (RFID) tag using a monopole antenna, comprising:
   a metal plate;
   an antenna structure, electrically connected to the metal plate,
   wherein the antenna structure has a first section and a second section, and one end of the first section and one end of the second section are electrically connected to the metal plate; and
   an RFID chip, having two ends electrically connected to the antenna structure,
   wherein the RFID chip, the antenna structure, and the metal plate form a loop structure,
   wherein the RFID chip electrically connects the other end of the first section and the other end of the second section,
   wherein the antenna structure and the metal plate form an included angle from 45 to 135 degrees.

2. The RFID tag according to claim 1, wherein the antenna structure is disposed on a central part of a surface of the metal plate.

3. The RFID tag according to claim 2, wherein the antenna structure is a planar antenna structure.

4. The RFID tag according to claim 1, wherein the antenna structure is disposed on a first side edge of the metal plate.

5. The RFID tag according to claim 4, wherein the antenna structure is a planar antenna structure.

6. The RFID tag according to claim 4, wherein the metal plate and the antenna structure are made of the same material and are configured into an integral structure.

7. The RFID tag according to claim 2, wherein the metal plate has a first portion and a second portion that are defined by a reference plane where the antenna structure is located, and the reference plane and the second portion form an included angle.

8. The RFID tag according to claim 7, wherein the RFID tag has an electromagnetic wave emitting direction, and the electromagnetic wave emitting direction varies according to the included angle.

9. The RFID tag according to claim 4, wherein the metal plate further comprises a second side edge opposite the first side edge, a reference plane where the antenna structure is located and an extended plane form an included angle, the extended plane is a plane extending from the first side edge along a first direction, and the first direction is a direction along which the second side edge faces the first side edge.

10. The RFID tag according to claim 9, wherein the included angle is from 45 degrees to 135 degrees.

11. The RFID tag according to claim 10, wherein the included angle is 90 degrees.

12. The RFID tag according to claim 9, wherein the RFID tag has an electromagnetic wave emitting direction, and the electromagnetic wave emitting direction varies according to the included angle.

13. The RFID tag according to claim 2, wherein the antenna structure further comprises an extended metal sheet, electrically connected to the loop structure.

14. The RFID tag according to claim 4, wherein the antenna structure further comprises an extended metal sheet, electrically connected to the loop structure.

* * * * *